United States Patent [19]

Leyendecker et al.

[11] 3,976,342

[45] Aug. 24, 1976

[54] METHOD AND APPARATUS FOR REDUCING FRETTING WEAR BETWEEN RELATIVELY MOVING PARTS

[75] Inventors: Ralf Leyendecker, Stuttgart; Günter Heinke, Gerlingen, both of Germany

[73] Assignee: Robert Bosch G.m.b.H., Stuttgart, Germany

[22] Filed: May 20, 1975

[21] Appl. No.: 579,230

Related U.S. Application Data

[63] Continuation of Ser. No. 369,703, June 13, 1973, abandoned.

[30] Foreign Application Priority Data

July 13, 1972 Germany............................ 2234428

[52] U.S. Cl............................. 308/237 R; 308/3 R; 308/239
[51] Int. Cl.²......................................... F16C 17/10
[58] Field of Search............ 308/237 R, 237 A, 238, 308/239, 240, 3 R, 5 R, 4 R

[56] References Cited
UNITED STATES PATENTS 2,905,511 9/1959 Cerness........................... 308/237 R Primary Examiner—M. H. Wood, Jr.
Assistant Examiner—Gene A. Church
Attorney, Agent, or Firm—William R. Woodward; Flynn & Frishauf

[57] ABSTRACT

Machine parts subject to relative vibration motion, in particular a metal spindle fitting with some play in the socket of another member as in the case of an ignition distributor arm joint, are provided, on at least one of the relatively moving surfaces, with closely spaced cavities in which wear products may accumulate, leaving a web-like engagement surface. The cavities do not permit displacement of materials in the direction of vibration, which has the advantage, if the engagement is greased, of holding the grease in the engagement area. Instead of providing the cavities by pits or grooves on one or both of the relatively vibrating surfaces, a perforated or woven and rolled insert of metal or tough synthetic material may be used.

24 Claims, 5 Drawing Figures

U.S. Patent  Aug. 24, 1976  3,976,342
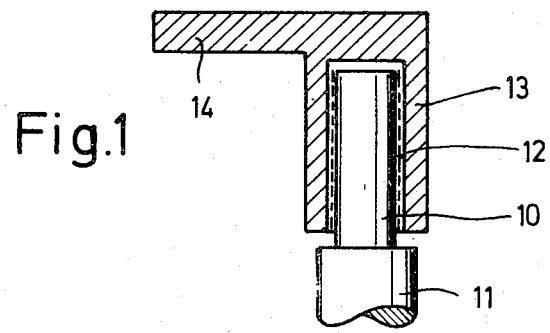
Fig.1
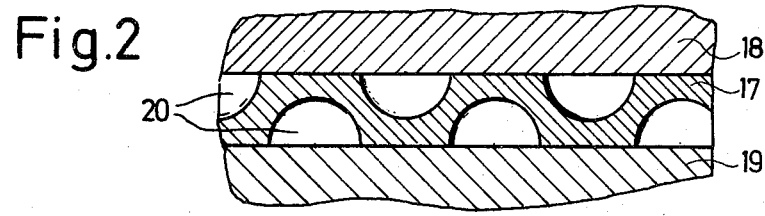
Fig.2
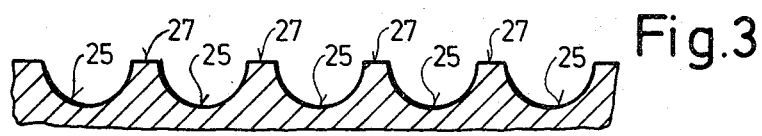
Fig.3
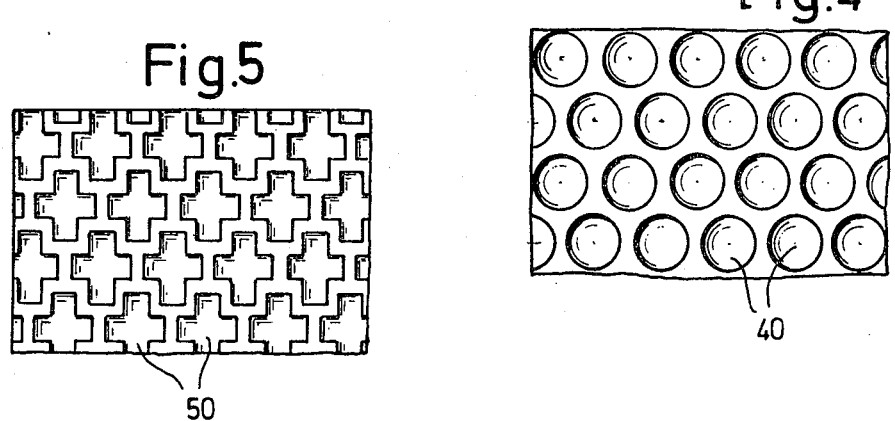
Fig.5
Fig.4

METHOD AND APPARATUS FOR REDUCING FRETTING WEAR BETWEEN RELATIVELY MOVING PARTS

This is a continuation, of application Ser. No. 369,703, filed June 13, 1973 now abandoned.

This invention relates to a method for improving the friction and wear properties of surfaces continually moving past each other and particularly in cases where at least one of the surfaces is metallic and the relative motion is vibratory.

The kind of wear known as "fretting corrosion" arises, for example, if two surfaces, at least one of them metallic, execute such relative vibratory movements, characteristically of small amplitude, under conditions in which there is also a normal force causing the surfaces to bear against each other. Oxide-containing abrasion products are then formed in greater volume than the material loss of the involved parts in fitted engagements designed to allow play between the parts. It can thus happen, for example, that the amount of play is progressively reduced and finally the play-joint ceases to function as such. The same observation applies also for the case in which the joint is greased, since the grease is readily made pasty by the effect of abrasion products. It is known to make such loose friction joints in a form with a boring having grooves like screw threads or grooves running in the axial direction. These constructions have the disadvantage, however, in such joints which, according to choice, may be used with or without grease, that if grease is used, within a short time the grease will be carried away by the arrangement of the grooves and will hence no longer be available at the place where it will be needed, that is, where the fretting corrosion takes place.

It is an object of the present invention to provide a method by which relatively moving surfaces can be subject to a relative vibratory movement, with or without the use of grease to facilitate the movement, for a long period without interference from abrasion products produced by the relative vibration and without damage to the surfaces.

SUBJECT MATTER OF THE PRESENT INVENTION

Briefly, the continuity of the frictional surface engagement is interrupted by the provision in the friction zone of a multiplicity of individual cavities to pick up the abrasion and wear products. The cavities have a minimum mouth area of 0.02 mm$^2$ and they are provided in sufficient number to be close to each other and to leave a network of narrow strips to form a web-like bearing surface. The ratio of this web-like bearing surface area to the aggregate area interposed by the cavities is between 0.05 and 6 and preferably between 0.1 and 1. Grooves or pits may be provided upon the bearing surface of one of the relatively moving parts (the grooves being arranged perpendicular to the oscillatory movement) or a thin insert may be provided between the moving parts to contain the cavities and to present to the moving parts a web-like surface interrupted by the cavities. The insert is preferably of metal or of a nonreactive synthetic material such as polytetrafluoroethylene.

The invention is particularly suited for use in an inexpensive and long-lasting loose friction joint subject to oscillations, as for example the connection between shaft and arm of the distributor of the ignition system of a motor vehicle.

The invention will be described by way of example with reference to the accompanying drawing, wherein:

FIG. 1 is a cross-sectional view of a portion of an ignition distributor embodying the invention;

FIG. 2 is a cross section, broken away, showing a construction according to the invention utilizing a pitted separator member;

FIG. 3 is a cross section of a surface portion, broken away, of one of the two relatively movable parts in another embodiment of the invention, and FIGS. 4 and 5 are plan views of other possible forms of the surface bearing cavities in accordance with the invention.

FIG. 1 shows the portion of a motor vehicle ignition distributor to which the invention is particularly applicable, as an example of the use of the invention. About the cylindrical surface of the spindle of the distributor shaft 11 is a sleeve, of corresponding curvature, made of rolled metal fabric 12, having a thickness of about 0.2 mm. Lubricating grease is spread on and into the fabric 12 before the latter is put in place. The socket 13 is cupped over the spindle 10, being held by the distributor arm 14. There is play in the fit between the socket 13 and the spindle 10 of the distributor shaft 11, but if the fabric 12 were not placed in between, much fretting corrosion would be produced by wear as the quantity of lubricant originally provided would be reduced and as a downward escape of lubricant would be further favored by high motor temperatures around 120°C. As soon as the area where friction occurs is insufficiently lubricated and air and moisture can affect the site, fretting corrosion products are formed where the parts engage which ultimately limit and prevent the necessary play in the relative movements. With the fabric 12 inserted as shown, however, the fretting corrosion arising because of the oscillating frictional movement is delayed to a remarkable extent.

FIG. 2 shows in section one of the possible forms of construction of an insert for placing between relatively moving parts. In this case the insert 17 between the relatively moving parts 18 and 19 is provided with cavities 20 in the form of rounded pits on both of its sides. These pits are arranged in an interlocking pattern, with a pit on one side backing against a web on the other. The thickness of the insert may for example be 1.2 mm, the pits have a mouth diameter of 1.5 mm and the distance between the edges of two adjacent pits is about 1.0 mm. In this case the maximum depth of the half-spherical depressions is about 0.8 mm.

FIG. 3 shows in cross section how the surface of one of the relatively moving parts can be formed according to the invention for a case in which no insert between the parts is provided, as in FIG. 1. In this case grooves 25 are provided by turning the spindle in a lathe, leaving webs 27 between them. The grooves are circular rather than helical, so as not to carry away the lubricant. The width of the grooves at the frictional surface is about 0.8 mm and the separation between two groove edges 0.2 mm. The groove depth is 0.5 mm.

FIGS. 4 and 5 respectively show different types of pitted surfaces produced by etching. Circular depressions are shown in FIG. 4, whereas in FIG. 5 a rectilinear pattern is shown with cruciform depressions. In FIG. 4 the depressions have a diameter of one millimeter and a minimum distance between edges of adjoining depressions of about 0.1 mm. In the pattern of FIG. 5, each of the cruciform depressions has an area of about 1 mm², whereas the web width is about 0.2 mm.

It is important that the pits or other cavities should be numerous enough to be close to one another. In the case of grooves such as those illustrated in FIG. 3, if the lands between the grooves have a width of a few millimeters, the effectiveness in terms of delay of the fretting corrosion process is only rather small, because the region of effectiveness is inherently limited to the immediate neighborhood of the grooves. It follows, therefore, that the cavities are the more effective, the shorter the path is between them and the place of wear. One of the factors on which the minimum spacing of the cavities from each other depends is the surface pressure which is brought to bear at the place of frictional engagement, in terms of pressure per unit area.

It has been found that particularly favorable results are obtained if in the region occupied by the cavities the value of the ratio of the bearing surface area (web area) $A_b$ to the area of the cavities $A_c$ is in a range from 0.05 to 6.0, preferably this ratio $A_b/A_c$ is in a range from 0.1 to 1.0.

As already pointed out with reference to several illustrations in the drawing, the above-mentioned cavities can be produced in the frictional engagement area in various different ways. One possibility is to provide a perforated insert between the relatively moving surfaces. This perforated insert can be made from a thin sheet of metal, synthetic material or a self-lubricating material. A far ranging freedom in the choice of materials is possible in this connection. For metals, for example, steel as well as all the materials associated with the designation "bearing metals" such as for example phosphor bronze, come into consideration. In the case of synthetic materials thermoplastics, for example polytetrafluoroethylene (PTFE), are of particular interest, but thermosetting resins are also suitable if they are not too brittle. In the case of self-lubricating materials, two kinds come into consideration. There are first those that are themselves made of a solid with lubricating qualities, for example an insert made of graphite. The other kind involve a carrier material in which a lubricant is dispersed or impregnated. An insert can likewise be made of this type of material.

The thickness of the perforated insert should lie in the range from 0.02 to 2.0 mm and a thickness between 0.1 and 0.5 mm is particularly suitable. The perforated insert can have circular holes, in which case the smallest spacing between the neighboring hole edges should be in the range of 0.1 to 2.0 mm and preferably from 0.2 to 1.0 mm, and the hole diameter should be in the range of 0.2 to 10 mm, preferably between 0.5 and 1.0 mm.

The holes in a perforated insert, such as just discussed, do not need to be circular. They can have any desired shape. The spacing between adjacent edges of neighboring holes should be in the range from 0.1 to 2.0 mm, preferably between 0.2 and 1.0 mm, and the area of the individual holes should be in the range from 0.02 to 100 mm², preferably between 0.2 and 1.0 mm².

As already pointed out in connection with FIG. 2, however, the insert placed between relatively moving surfaces does not have to be perforated, that is, it does not have to have holes that go right through the material. It can, instead, have depressions, such as the rounded pits shown in FIG. 2, on one or both sides. They may be closed off, as in FIG. 2, or they may connect through in spots. Here again the insert may be of metal or of synthetic material and the same materials come into consideration as already mentioned above for the case of perforated inserts. The thickness of these inserts provided with pits on one or both sides, should be in the range from 0.05 to 5 mm and preferably between 0.1 and 2 mm. The spacing between the edges of two adjacent pits should be in the range from 0.1 to 2 mm and preferably between 0.2 and 1 mm. Also for pits that do not communicate through to the other side, the mouth area of an individual pit should be in the range of 0.02 to 100 mm² and preferably between 0.2 and 1 mm². The depth of such pits and depressions is between 5 and 90% of the thickness of the insert.

As already mentioned in connection with FIG. 1, the insert between the relatively moving surfaces may be made of a fabric of wire or synthetic fibers which has been rolled or pressed for reduction of values of pressure per surface area or for maintenance of tolerances, as the case may be. Here again also the same materials come into consideration as in the previously mentioned kinds of insert. The mesh width of such a fabric should be in the range between 0.02 and 10 mm, preferably between 0.1 and 1 mm and the wire or fiber thickness between 0.01 and 1.5 mm, preferably between 0.05 and 0.5 mm. The fabric thickness is reduced by rolling or pressing to an extent of not less than 5% of the original thickness.

As mentioned in connection with FIGS. 3, 4 and 5, the cavities provided in accordance with the invention need not be introduced by means of an insert between the relatively movable parts, because pits or other depressions can readily be provided on one or both of the relatively movable surfaces themselves. When no insert is used, at least one of the relatively movable engaging surfaces is provided with a multiplicity of fine depressions by first profiling the surface by mechanical, chemical, electrochemical or electrical processing and then superficially rolling, machining or grinding the surface to obtain a smooth web for a bearing and/or for maintaining or establishing dimensional tolerances, as may be required. The processing methods for creating the depressions are all known. All mechanical procedures may, for example, be named: lathe machining, pressing, milling, scouring and punching. Among the chemical treatment methods etching with a suitable fluid is above all to be considered, in which connection a mask is commonly applied beforehand on the surface to be etched to define the etching pattern. In the case of electrochemical treatment methods the so-called ECM process, electrochemical machining, is particularly to be considered, whereas spark erosion comes into consideration for the case of electrical processes.

The above described embodiments of the invention, in each of which cavities are provided in which the product of wear of the moving surfaces can be picked up, produce a significant lengthening of the running time of the apparatus, compared to similar apparatus not using the invention, even when the cavities are not additionally used as an advantageous location for a supply of lubricating material. Still further increase of the trouble-free operating time of a mechanism utilizing the invention can be obtained by filling with lubricant the cavities present on at least one of the relatively moving surfaces. In this case the cavities serve at the same time as disposal spaces for the wear products and as lubricant supply.

Although in general the addition of lubricant is generally preferred in the practice of the present invention, there are nevertheless applications in which the use of the usual lubricant is dangerous or otherwise out of the question. For example, that is the case when the use of a lubricant would provide risk of explosion. As above mentioned, even in those cases in which the use of a lubricant does not appear to be appropriate, the utilization of the present invention can provide a prolongation of the trouble-free operating time of an apparatus involving the engagement of relatively moving metal surfaces.

The extent of improvement produced both with and without the presence of a lubricant by the practice of this invention is illustrated in Table I, in which are given the results of operation of a test device in fretting corrosion test machine. The apparatus tested in each case tabulated in Table I involved a spindle of 10 mm diameter and 25 mm length mounted in a socket of 22 mm outside diameter and 10 mm height where it could oscillate with a small amount of play. The amplitude of the axial movement of the spindle in the socket amounted to $\pm 25$ $\mu$m, the frequency was 100 Hz, and a loading of 5 kiloponds of transverse force was applied to the spindle against the socket. The tests were carried out at room temperature.

TABLE I

| Test No. | Type of Bearing | Play | Lubrication | Duration of Test | Results [FC = abbr. for Fretting Corrosion] |
|---|---|---|---|---|---|
| 1 | smooth surfaces (no cavities) | 20 $\mu$m | none | 30 sec | Seizure caused by FC products. Separation possible only by force. Friction force after seizure 70 kp. |
| 2 | smooth surfaces (no cavities) | 20$\mu$m | grease | 10 min | Seizure caused by FC products. Separation possible only by force. |
| 3 | Fig. 3 (grooved spindle | 20 $\mu$m | grease | 5 h | Increase of friction from $\pm$ 0.8 kp to $\pm$ 2 kp after breakdown of grease film. FC patches, but no seizure. |
| 4 | rolled steel fabric insert sleeve | 40 $\mu$m | none | 5 h | FC products collected on sleeve screen No seizure. Friction force $\pm$ 3 kp. Imprint of screen on spindle and boring. |
| 5 | smooth surfaces no cavities | 40 $\mu$m | grease | 16 h | First FC products appear only after raising transverse force to 10 kp. This brings friction force up from $\pm$ 1 kp to $\pm$ 1.5 kp. |

A further test, not tabulated in Table I, was run on a special testing machine for engine ignition distributors with a distributor structure using a grooved spindle (FIG. 3 and also test 3 in Table I). In 30 hours of continuous running time, no fretting corrosion appeared and at the end of the test, the engagement of the spindle and the cup still permitted easy motion.

From the results tabulated in Table I and the results of the further test just mentioned, the advantages obtainable by the practice of the present invention stand clear: in the case of engagements of a shaft in a bore, with some play, in which the teaching of the present invention is not utilized, the spindle becomes seized in the bore after a short time, whether or not the engagement is greased at the beginning. On the other hand, no such seizure occurs or is even approached for a long time if either the spindle is provided with close spaced circumferential grooves of the kind described by reference to FIG. 3, or else when a rolled metal fabric is inserted between the engaging surfaces of the two relatively moving parts. By far the best results are obtained by the combination of rolled metal screening as an insert and the use of grease or some other lubricant. It is particularly to be noted that in contrast to the first two tests, in which in both cases a smooth spindle was used and the bearing became inoperative, in none of the other tests did the loose fit operating as a bearing fail to remain operative.

The present invention provides a method and certain varieties of apparatus for lengthening the relatively small periods of operability of close fit structures allowing play and relative motion between metal parts, which has heretofore been limited by the effects of fretting corrosion. The additional cost necessary to obtain these results is insignificant in comparison with the reduction in wear and damage made possible by the practice of the invention.

What I claim:

1. The method of improving the friction and wear properties of two surfaces moving against each other with vibratory slip motion, at least one of which surfaces is metallic, which comprises interrupting the continuity of frictional surface engagement by the provision in the friction zone of a multiplicity of individual cavities each of a mouth area of at least 0.02 mm$^2$ in such number as to be close to each other and to leave a network of narrow strips to form thereby a web-like bearing surface, whereby the products of wear are taken up by said cavities, said cavities being substantially empty and being provided in such a manner that they have openings facing at least one of said moving surfaces which is free to move in vibratory motion across said opening of said cavities.

2. A method as defined in claim 1 in which, in the region of said cavities, the ratio of bearing surface area $A_b$ to the aggregate mouth area of said cavities is between the limits of 0.05 and 6.0.

3. A method as defined in claim 2 in which said ratio $A_b / A_c$ lies between 0.1 and 1.0.

4. A method as defined in claim 2 in which said cavities are provided in said friction zone by the provision of a perforated separator sheet between said relatively moving surfaces containing said cavities and providing a web-like bearing surface to each of said relatively moving surfaces.

5. A method as defined in claim 4 in which said perforated separator sheet consists of a material selected from the group consisting of metal, synthetic resin material and self-lubricating materials.

6. A method as defined in claim 4 in which said perforated separator sheet has a thickness between 0.02 and 2 mm.

7. A method as defined in claim 6 in which said perforated separator sheet has circular holes, such that the smallest distance between two neighboring hole edges lies between 0.1 and 2.0 mm and the hole diameter is between 0.2 and 10 mm.

8. A method as defined in claim 6 in which said perforated separator sheet has noncircular holes, such that the distance between edges of adjacent holes lies between 0.1 and 2.0 mm and the area of the individual holes lies between 0.02 and 100 mm$^2$.

9. A method as defined in claim 2 in which said cavities are provided by the insertion between said relatively moving surfaces of a separator sheet with a pitted surface on at least one side.

10. A method as defined in claim 9 in which said interposed separator sheet has pitted surfaces on both sides and provides a web-like bearing surface to each of said relatively moving surfaces, the pits of the two sides of said separator piece being interlocked, with a pit on one side generally corresponding to a web on the other.

11. A method as defined in claim 10 in which said separator sheet is of metal or synthetic material.

12. A method as defined in claim 11 in which said separator sheet has a thickness between 0.05 and 5 mm, the distance between the edge of adjacent pits on the same surface is between 0.1 and 2 mm the cross sectional area of individual pits at the mouth thereof is between 0.02 and 100 mm$^2$ and the depth of said pits is between 5 and 90% of the thickness of said separator sheet.

13. A method as defined in claim 2 in which said cavities are provided by the provision between said relatively moving surfaces of a wire or synthetic fiber fabric sheet, which prior to insertion has been flatened by rolling or pressing.

14. A method as defined in claim 13 in which the mesh width of said fabric is between 0.02 and 10 mm and the wire or fiber thickness between 0.01 and 1.5 mm and in which the fabric thickness is reduced by not less than 5% of its original thickness by rolling or pressing.

15. A method as defined in claim 2 in which at least one of said relatively moving surfaces is provided with fine pits or grooves by the successive steps of roughening the profile of the surface and then superficially smoothing the surface to provide a smoothness of web-like bearing surface within a required tolerance.

16. A rotary force transmitting coupling comprising a spindle end and a member having a socket loosely mating said spindle end with a clearance space between the spindle periphery and the walls of said socket sufficient to provide play in the relative position of said spindle and said socket and thereby to allow vibratory relative slip movement between said spindle end and said socket in response to vibratory forces, said spindle being mounted for rotary motion about a longitudinal axis thereof and at least one of said spindle and the socket portion of said member being made of metal, wherein the improvement is provided that:

frictional engagement of said spindle end and said socket is limited to a network of narrow strip areas by the provision of a multiplicity of substantially empty cavities in the surface of one of said spindle end and said socket, and said cavities have a minimum mouth cross-sectional area of 0.02 mm$^2$.

17. A rotary force transmitting coupling comprising a spindle end and a member having a cup-shaped hollow socket loosely mating said spindle end with a clearance space between the spindle periphery and the walls of said socket sufficient to provide play in the relative position of said spindle and said socket and thereby to allow vibratory relative slip movement between said spindle end and said socket in response to vibratory forces, said spindle being mounted for rotary motion about a longitudinal axis thereof, at least one of said spindle and the socket portion of said member being made of metal, wherein the improvement is provided that:

a thin insert is provided between said spindle end and the socket portion of said member separating them and consisting of a sheet of firm tough material having substantially empty cavities opening to at least one side of said sheet, said sheet being equally free to slip relative to the said parts on both sides of it, and said cavities have a minimum mouth cross-sectional area of 0.02 mm$^2$.

18. A rotary force transmitting coupling as defined in claim 17 in which said cylindrical sleeve is made of metal.

19. A rotary force transmitting coupling as defined in claim 18 in which said sleeve is made of a pressure flattened wire fabric.

20. A rotary force transmitting coupling as defined in claim 18 in which said sleeve is made of perforated metal.

21. A rotary force transmitting coupling as defined in claim 18 in which said sleeve is made of a thin metal sheet pitted on both sides in an interlocking pattern in which a pit on one side is backed by a web on the other.

22. A rotary force transmitting coupling as defined in claim 17 in which said cavities are provided at least in part by perforations in said insert.

23. A rotary force transmitting coupling as defined in claim 17 in which said cavities are provided on both sides of said insert in the form of pits, said pits being provided in an interlocking pattern in which pits on one side of said insert are backed by a web between pits on the other side of said insert.

24. A rotary force transmitting coupling as defined in claim 17 in which said insert is a pressure flattened fabric of filaments of a firm tough material.

* * * * *